United States Patent [19]
Aronowitz et al.

[11] Patent Number: 5,854,677
[45] Date of Patent: Dec. 29, 1998

[54] RLG OPTICAL NOISE INJECTOR

[75] Inventors: Frederick Aronowitz, Laguna Niguel; Ludd A. Trozpek, Claremont, both of Calif.

[73] Assignee: Rockwell International Corporation, Seal Beach, Calif.

[21] Appl. No.: 576,767

[22] Filed: Aug. 31, 1990

[51] Int. Cl.$^6$ .............................. G01B 9/02; H01S 3/083
[52] U.S. Cl. ............................................. 356/350; 372/94
[58] Field of Search ................................ 356/350; 372/94

[56] References Cited

U.S. PATENT DOCUMENTS

| | | |
|---|---|---|
| 3,533,014 | 10/1970 | Coccoli et al. . |
| 4,281,930 | 8/1981 | Hutchings . |
| 4,410,273 | 10/1983 | Ljung et al. . |
| 4,410,274 | 10/1983 | Ljung . |
| 4,628,515 | 12/1986 | Rodloff et al. . |
| 4,632,555 | 12/1986 | Malvern . |
| 4,653,919 | 3/1987 | Stjern et al. . |
| 4,681,446 | 7/1987 | Yeh . |
| 4,686,683 | 8/1987 | Martin . |
| 4,705,398 | 11/1987 | Lim et al. . |
| 4,807,999 | 2/1989 | Soo Hoo . |
| 4,815,851 | 3/1989 | Soohoo . |
| 4,830,495 | 5/1989 | SooHoo et al. . |

*Primary Examiner*—Stephen C. Buczinski
*Attorney, Agent, or Firm*—H. Frederick Hamann; George A. Montanye; Tom Streeter

[57] ABSTRACT

An RLG OPTICAL NOISE INJECTOR places a random signal on a PZT driving one mirror controlling the optical path length (OPL) of a ring laser gyro (RLG) and the negative of the signal on a PZT driving a second mirror controlling the OPL. The OPL is therefore maintained constant while injecting random noise into the phase of the counterpropagating beams to avoid dynamic lock-in. Static lock-in may also be avoided by superposing an oscillatory signal on the random signal fed to the first PZT and the negative of the oscillatory signal on the random signal fed to the second PZT.

8 Claims, 2 Drawing Sheets

RLG OPTICAL NOISE INJECTOR

BACKGROUND OF THE INVENTION

The present invention relates to ring laser gyroscopes or ring laser gyros (RLGs), and has particular relation to methods for injecting noise into the RLG to prevent dynamic lock-in.

A ring laser gyro comprises a pair of laser beams bouncing around a square, a diagonal mirror being placed at each corner of the square. A rotation of the gyro causes the interference fringes produced by the two counter propagating beams to move in one direction or the other. The number of fringes which passes a given point is an indication of the angle through which the ring laser gyro has passed. When the ring laser gyro is rotating very slowly, the frequencies of the two counter propagating beams are very close to each other; when it rotates rapidly, the frequencies are much further apart. When the frequencies are close to each other, the two beams tend to lock into each other, just as two lightly coupled pendulums, of slightly different length, will oscillate at the same frequency when the lengths (and hence the frequencies) become close enough.

The solution is dithering. The entire ring laser gyro is twisted and untwisted 500 times a second so that, most of the time, its angular velocity is far from 0.500 Hz is a typical frequency. Ring laser gyros tend to be very resonant mechanically, so that almost any reasonable input frequency will result in an output frequency which is determined entirely by the ring laser gyro and its mounting. In the mechanical analog, this is equivalent to putting the pendulums on opposite ends of a pair of pulleys, and oscillating the rope between the pulleys, so that one pendulum gets longer (and hence slower) as the other gets shorter (and hence faster). Since the frequencies rarely get close to each other, there is little opportunity for lock-in. "Little opportunity," however, does not mean "on opportunity." If the phase of the dithering signal is exactly correct, then the coupled pendulums will remain coupled, despite the instantaneous differences in their frequencies, since the nominally random dither signal will put the pendulums into exactly the same configuration at the end of one dither cycle as at the beginning. When this occurs, the pendulums will lock together, even though their frequencies vary continuously. This problem is called "dynamic lock-in," and occurs in a dithered ring laser gyroscope when the gyro is being turned slowly or approximately at a multiple or harmonic of some characteristic frequency. Dynamic lock-in is thus seen as distinct from "static lock-in," which occurs only when an undithered ring laser gyroscope is being turned slowly, although not as slowly as is required for dynamic lock-in.

The conventional solution to dynamic lock-in has been the injection of a random noise signal. Creating a random signal is not all that difficult; the difficult part is imparting this random signal to the ring laser gyro. As has been stated above, ring laser gyros are very resonant. This is especially true when the gyro is hard mounted onto the object of interest, such as an intercontinental ballistic missile (ICBM), in order to give a precise indication as to where the ICBM is pointed. A shock absorbent mount, which would allow a noise signal to be injected into the ring laser gyro, has too much slop in it. It allows too great of a deviation between the orientation of the ring laser gyro and the orientation of the ICBM itself.

SUMMARY OF THE INVENTION

Applicants have therefore turned to optical injection of a noise signal, rather than mechanical injection. As has been noted above, a ring laser gyroscope typically comprises a square, with a diagonal mirror at each corner of the square. To control the length of the optical path, two mirrors, at say, the lower left and lower right corner, are moved up and down together. They are moved up together when some sensing apparatus determines that the optical path length (OPL) is too long; they are moved down together when the sensing apparatus determines that the OPL is too short.

It is perfectly possible, however, to move the lower left mirror up while moving the lower right mirror down, or vice versa. In this way, the OPL remains constant, yet the phase of the counter propagating beams is changed. Injecting a random noise signal in this push/pull mode of operation, over and above the push/push, pull/pull path length control mode of operation, allows a noise signal to be injected into the ring laser gyroscope optically, rather than mechanically. The piezoelectric transducers controlling the mirror's position generally do not have the sharp resonant peak that the ring laser gyro as a whole does. There is, therefore, no barrier to this optical injection, and dynamic lock-in is eliminated.

Indeed, by applying a suitable electric dithering signal to the mirrors, optical dithering could be produced. This could be done instead of, or in addition to, applying a mechanical dither to the ring laser gyro as a whole, with the resultant mechanical dithering. Optical dithering adds to the complexity of the electronics, since now three signals (path length control, dither, noise) must be applied to the mirrors rather than two. In some situations, where mechanical dithering is relatively straight forward, the added complexity is not worthwhile. In other situations, where mechanical dithering is to be avoided, optical dithering has a place.

DETAILED DESCRIPTION OF A PREFERRED EMBODIMENT

Figure 1:
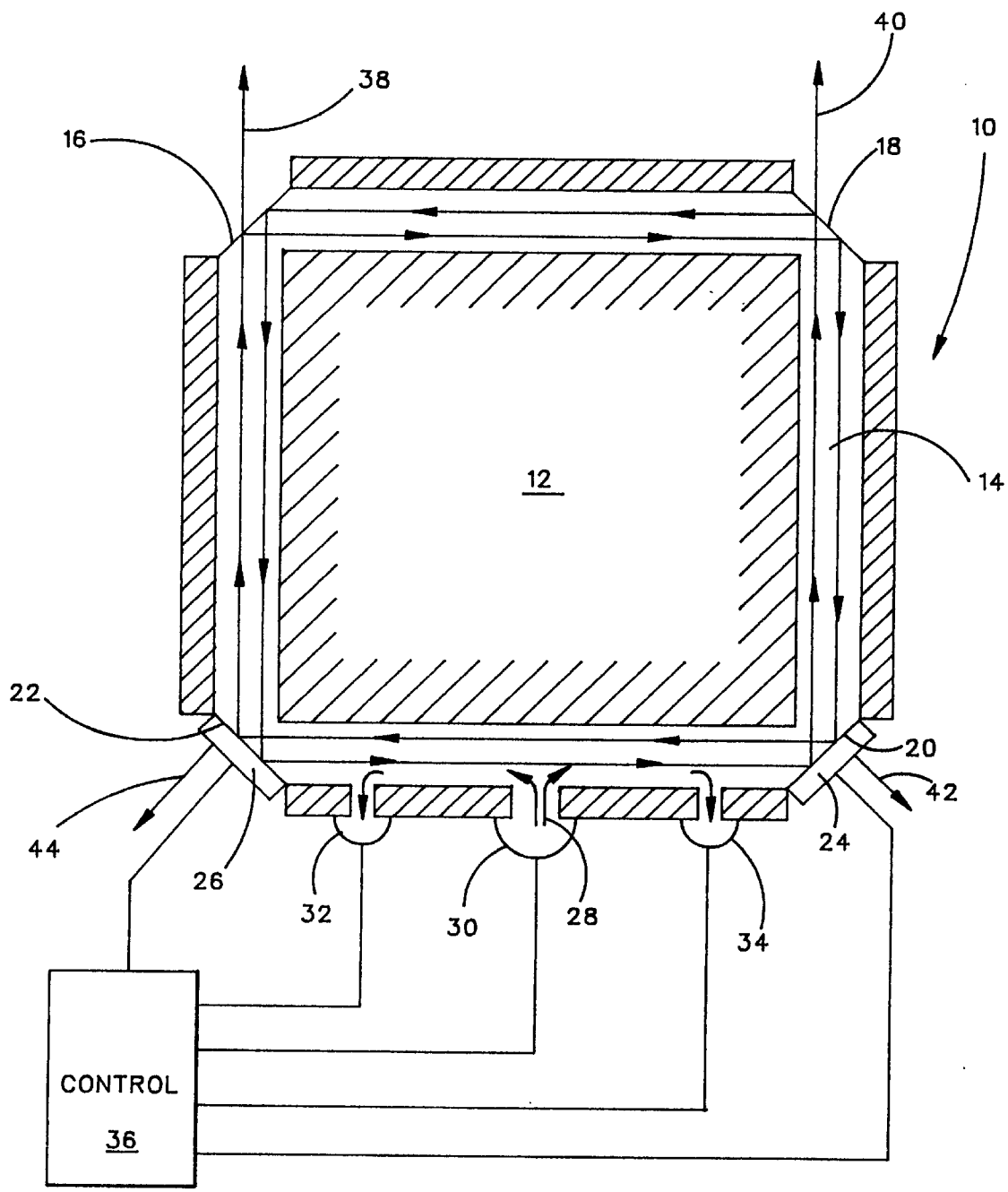
FIG. 1 is a schematic cross sectional view of a ring laser gyro and associated control apparatus.
Figure 2:
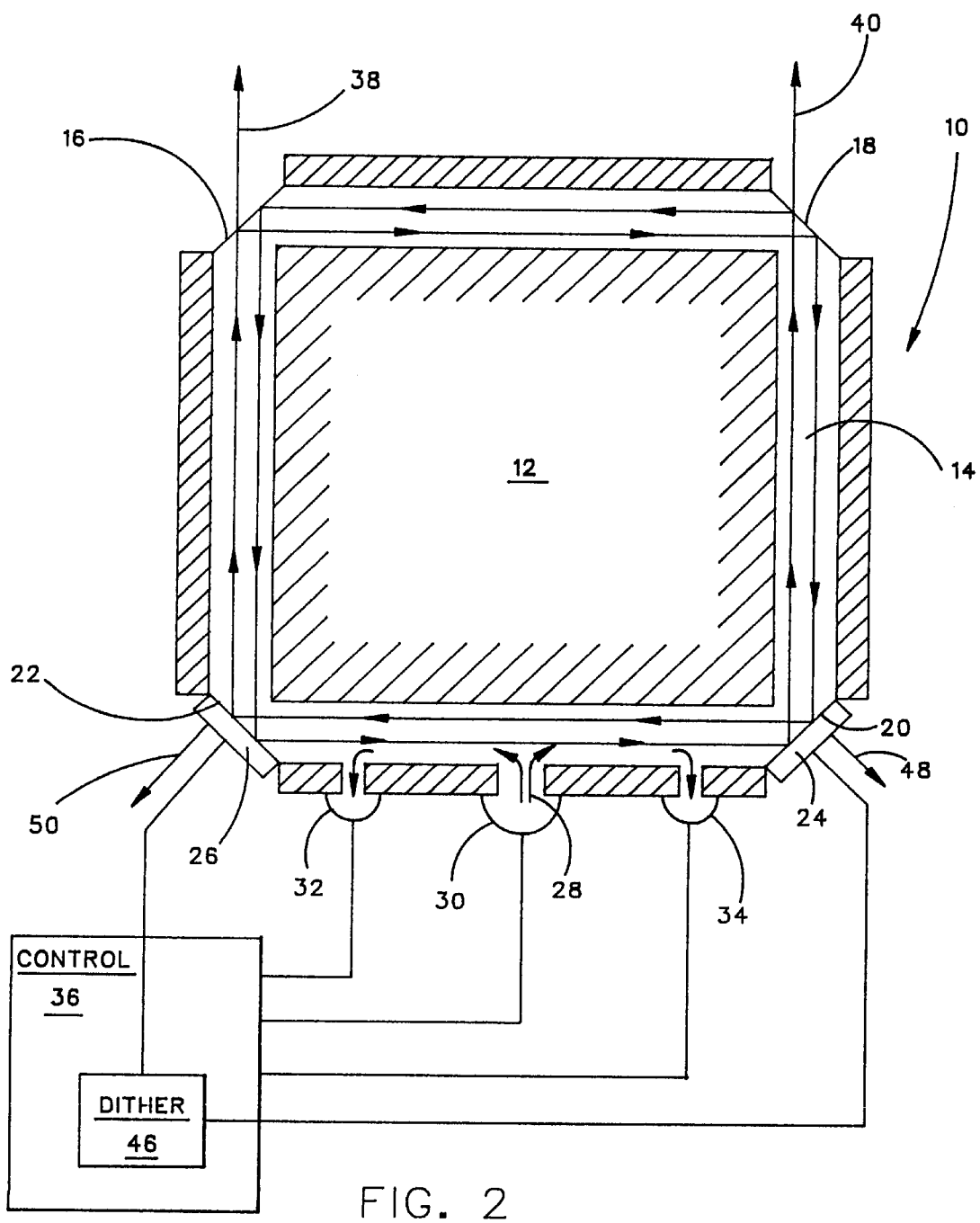
FIG. 2 is similar to FIG. 1, and additionally shows the noise generator and push/pull optical injector.

FIG. 1 shows a ring laser gyro 10 which includes a glass block 12 into which an optical path 14 has been bored. The optical path 14 is bounded at its corners by mirrors 16, 18, 20, and 22. Mirrors 16 and 18 are half silvered; mirrors 20 and 22 are backed, respectively, by PZTs 24 and 26. The optical path 14 contains a lasing gas, which is caused to lase by current 28 passing from a central cathode 30 to oppositely disposed anodes 32 and 34. The current going to each anode 32 or 34 is actively stabilized and equalized by a controller 36. It is important that the current flow in each direction be the same, in order that clockwise propagating light 38 and counterclockwise propagating light 40 not have their relative speeds affected by any net ion or electron drift caused by the current 28. Then, as the ring laser gyro 10 rotates, the effective OPL for the clockwise propagating beam of light 38 will differ from that of the counterclockwise propagating beam of light 40, and this difference can be used to form an interference fringe, from which the angular velocity of the ring laser gyro 10 may be deduced.

The control apparatus 36 controls the length of the optical path 14 to be an exact multiple of the wavelength of the light 38 and 40 passing through it. If the length of the optical path 14 is too short, then the PZTs 24 and 26 are operated so as to move the mirrors 20 and 22 outward, as indicated by arrows 42 and 44. If the length is too long, the PZTs 24 and 26 move the mirrors 20 and 22 inward, in the direction opposite that of the arrows 42 and 44.

The precisely controlled length of the optical path 14 causes the counter propagating light rays 38 and 40 to act as oscillators at the same frequency. This frequency changes differentially as the ring laser gyro 10 is rotated. If the mirrors 16, 18, 20, and 22 were perfect, then these two oscillators would be uncoupled, and would not affect each other's frequency. However, minute imperfections in the mirrors 16, 18, 20, and 22 cause back scattering, which in turn causes a slight coupling between the two oscillators, which in turn causes the two oscillators to lock to the same frequency when the frequency difference becomes sufficiently small. As a result, a low angular velocity of the ring laser gyro 10 is interpreted as no angular velocity at all. One solution to this static lock-in problem is to impose a sinusoidal dither on the mirrors 20 and 22 by having the control apparatus 36 include a dithering apparatus 46, which produces a sinusoidal voltage to the PZTs 24 and 26. It is important that the PZTs 24 and 26 be driven exactly 180° out of phase. This is indicated by the arrow 48, associated with PZT 24, pointing inward, while the arrow 50, associated with the PZT 26, points outward. A half cycle later, these two directions are, of course, reversed. If this 180° phase difference is maintained, then the length of the optical path 14 is not affected, and path length stabilization may be continued as was shown in FIG. 1. The dither shown by arrows 48 and 50 is superimposed on top of the path length control shown by arrows 42 and 44. The ring laser gyro 10 thus avoids both path length drift and static lock-in.

What the ring laser gyro 10 does not avoid, using the foregoing method, is dynamic lock-in. At multiples of a characteristic low rate of angular velocity, the sinusoidal dither applied to the mirrors 20 and 22 will produce an apparent condition of rest of all four mirrors. As the ring laser gyro 10 passes through each of these characteristic frequency multiples, a brief lock-in occurs, and error rapidly accumulates.

This systematic accumulation of error may be avoided by randomly dithering the division of the current 28 flowing from the cathode 30 to the anodes 32 and 34. While the total current remains constant, thereby maintaining the brightness of the laser at a constant value, its division between the clockwise anode 32 (so called because current flowing to it from the cathode 30 moves in the clockwise direction) and the counterclockwise anode 34 is randomly dithered. This introduces a random error into the detected rate of rotation. However, this random error is generally smaller than the systematic error which would persist in the presence of dynamic lock-in.

Random dithering of the current division 28 is not entirely satisfactory. More error is injected into the RLG than is necessary to control dynamic lock in, since all the problems which are present when only a single anode is used are re-introduced when either anode carries more current than the does the other, however transiently.

Applicants therefore prefer to randomly dither the PZTs 24 and 26, instead of, or in addition to, sinusoidal dithering. While the dithering of the PZTs 24 and 26 is random with respect to the remainder of the ring laser gyro 10, the dithering of the PZT 24 is not random with respect to the dithering of the PZT 26; these two ditherings remain 180° out of phase. "Phase" is an imprecise concept when applied to a random signal. More precisely, therefore, the random signal applied to PZT 24 is the negative of the random signal applied to PZT 26. Thus, any increase in the OPL due to the random dithering of PZT 24 is exactly matched by a decrease in the OPL introduced by the dithering of PZT 26, and vice versa. The dithering apparatus 46 is thus, in accordance with the present invention, a random dithering apparatus. To the extent that the dithering of PZTs 24 and 26 merely provides path length control, such dithering is beyond the scope of the present invention.

Applicants prefer that the increase in OPL induced by the random signal applied to PZT 24 be exactly matched by the decrease induced by PZT 26. Such an exact match avoids additional stress on the control apparatus 36 in its efforts to keep the OPL constant. However, an inexact or approximate match is acceptable if the control apparatus 36 can handle it. The decision as to how much exactness should be built into the dithering apparatus 46 versus how much exactness can be tolerated by the control apparatus 46 is a design choice.

A truly random signal is not always necessary, and a pseudo-random signal will often be sufficient. "Noise," as used herein, includes both random and pseudo-random signals which are sufficient to at least reduce dynamic lock-in; and "random" includes "pseudo-random" to the extent that a pseudo-random dither produces any of the aforementioned desirable results.

In addition to the random motions applied to the mirrors 20 and 22 in push/pull fashion, sinusoidal or other oscillatory motions may also be push/pull applied to the mirrors 20 and 22. This has a differential effect on the counterpropagating light beams similar to that caused by mechanically dithering the entire RLG 10, and obviates the need for such mechanical dithering. This additional push/pull oscillation is most conveniently accomplished by superposing a sinusoidal or other oscillatory signal onto the random signal which is applied to PZT 24. The negative of the oscillatory signal may be separately applied to PZT 26 directly or by phase shifting, or it may be applied to PZT 26 by negating the superposed oscillatory/random signal applied to PZT 24. Other convenient methods of additionally applying a push/pull oscillatory signal will occur to those having ordinary skill in the art.

Industrial Applicability

The present invention is capable of exploitation in industry, and can be used, whenever lock-in of a ring laser gyro is sought to be avoided. It can be made from components which, each being considered in isolation from the others, are entirely conventional, or it can be made from their non-conventional counterparts.

While a particular embodiment of the present invention has been described in detail herein, the true spirit and scope of the present invention is not limited thereto, but is limited only by the following claims.

What is claimed is:

1. A method for preventing or reducing dynamic lock-in of a ring laser gyro (RLG) having at least two mirrors controlling an optical path length (OPL) of the RLG, comprising:

(a) moving a first mirror in such a manner as to randomly change the OPL of the RLG; and (b) simultaneously moving a second mirror in such a manner as to at least approximately counteract the OPL change induced by the first mirror.

2. The method of claim 1, wherein:

(a) the first mirror moving step comprises applying a random signal to a PZT driving the first mirror; and (b) the second mirror moving step comprises simultaneously applying at least approximately the negative of the random signal to a PZT driving the second mirror.

3. The method of claim 1, further comprising the steps of:

(a) on the first mirror, superposing a motion changing the OPL of the RLG in an oscillatory manner on the motion changing the OPL of the RLG randomly; and (b) on the second mirror, superposing a motion changing the OPL of the RLG in such a manner as to both be oscillatory and to at least approximately counteract the OPL change induced by the oscillatory motion of the first mirror on the motion which at least approximately counteracts the random changes of the OPL of the RLG induced by the first mirror.

4. The method of claim 3, wherein:

(a) the first mirror moving step comprises applying a superposed random signal and oscillatory signal to a PZT driving the first mirror; and (b) the second mirror moving step comprises simultaneously applying at least approximately the negative of the superposed random signal and oscillatory signal to a PZT driving the second mirror.

5. Apparatus for preventing or reducing dynamic lock-in of a ring laser gyro (RLG) having at least two mirrors controlling an optical path length (OPL) of the RLG, comprising:

(a) means for moving a first mirror in such a manner as to randomly change the OPL of the RLG; and (b) means for simultaneously moving a second mirror in such a manner as to at least approximately counteract the OPL change induced by the first mirror.

6. The apparatus of claim 5, wherein:

(a) the first mirror moving means comprises means for applying a random signal to a PZT driving the first mirror; and (b) the second mirror moving means comprises means for simultaneously applying at least approximately the negative of the random signal to a PZT driving the second mirror.

7. The apparatus of claim 5, further comprising:

(a) on the first mirror, means for superposing a motion changing the OPL of the RLG in an oscillatory manner on the motion changing the OPL of the RLG randomly; and (b) on the second mirror, means for superposing a motion changing the OPL of the RLG in such a manner as to both be oscillatory and to at least approximately counteract the OPL change induced by the oscillatory motion of the first mirror on the motion which at least approximately counteracts the random changes of the OPL of the RLG induced by the first mirror.

8. The apparatus of claim 7, wherein:

(a) the first mirror moving means comprises means for applying a superposed random signal and oscillatory signal to a PZT driving the first mirror; and (b) the second mirror moving means comprises means for simultaneously applying at least approximately the negative of the superposed random signal and oscillatory signal to a PZT driving the second mirror.

* * * * *